US012270683B2

(12) United States Patent
Graner et al.

(10) Patent No.: US 12,270,683 B2
(45) Date of Patent: Apr. 8, 2025

(54) MEASURING DEVICE FOR MEASURING A PHYSICAL VALUE IN A UNIT CONTAINING A MEDIUM

(71) Applicant: SICK AG, Waldkirch (DE)

(72) Inventors: Thomas Graner, Waldkirch (DE); Stephan Armbruster, Waldkirch (DE)

(73) Assignee: SICK AG, Waldkirch (DE)

(*) Notice: Subject to any disclaimer, the term of this patent is extended or adjusted under 35 U.S.C. 154(b) by 235 days.

(21) Appl. No.: 18/135,384

(22) Filed: Apr. 17, 2023

(65) Prior Publication Data

US 2023/0366704 A1    Nov. 16, 2023

(30) Foreign Application Priority Data

May 16, 2022   (DE) .......................... 102022112227.1

(51) Int. Cl.
| | | |
|---|---|---|
| *G01D 11/30* | (2006.01) | |
| *G01D 11/24* | (2006.01) | |
| *H01R 13/52* | (2006.01) | |
| *H01R 13/74* | (2006.01) | |

(52) U.S. Cl.
CPC ........... *G01D 11/245* (2013.01); *G01D 11/30* (2013.01); *H01R 13/5219* (2013.01); *H01R 13/746* (2013.01)

(58) Field of Classification Search
CPC .. G01D 11/245; G01D 11/30; H01R 13/5219; H01R 13/746
See application file for complete search history.

(56) References Cited

U.S. PATENT DOCUMENTS

2002/0150347 A1 * 10/2002 Fujiwara .............. G02B 6/3825
                                                                 385/56
2022/0082466 A1 *  3/2022 Huang .................... G01L 21/12

FOREIGN PATENT DOCUMENTS

| DE |       3635165 A1 * |  4/1988 | |
|---|---|---|---|
| DE |      10127485 A1 * | 12/2002 | ......... H01R 13/5227 |
| DE |  102007024472 A1 * | 11/2008 | .............. B60S 1/166 |

(Continued)

*Primary Examiner* — Jamel E Williams
(74) *Attorney, Agent, or Firm* — Nath, Goldberg & Meyer; Jerald L. Meyer

(57) ABSTRACT

To obtain a measuring device (1) with ingress protection classes that can be manufactured simply and inexpensively, a measuring device (1) for measuring a physical value in a unit containing a medium is provided comprising a housing (2) that has a wall (2a) for housing electronic measurement equipment and a connection section (2b) for connecting the measuring device (1) to the unit; a membrane (4) that is provided at the wall (2a) to cover a first opening in the wall (2a); and a plug connection (5) that is provided adjacent to the membrane (4) at the wall (2a) and that is configured to provide an electrical connection between the electronic measurement equipment and electrical plug contacts for a plug connectable to the measuring device (1); a second opening (3b) into which the plug connection (5) is pluggable, wherein the plug connection (5) is formed with a fastening section (6) for fastening the plug connection (5) to the wall (2a) of the housing (2) and the fastening section (6) has a flange element (6a), wherein the flange element (6a) is arranged on an outer side of the wall (2a) and the flange element (6a) is configured to cover the first opening (3a) and to have at least one outlet bore (10) that is in communication with the first opening (3a).

11 Claims, 4 Drawing Sheets

(56) References Cited

FOREIGN PATENT DOCUMENTS

Figure 1:
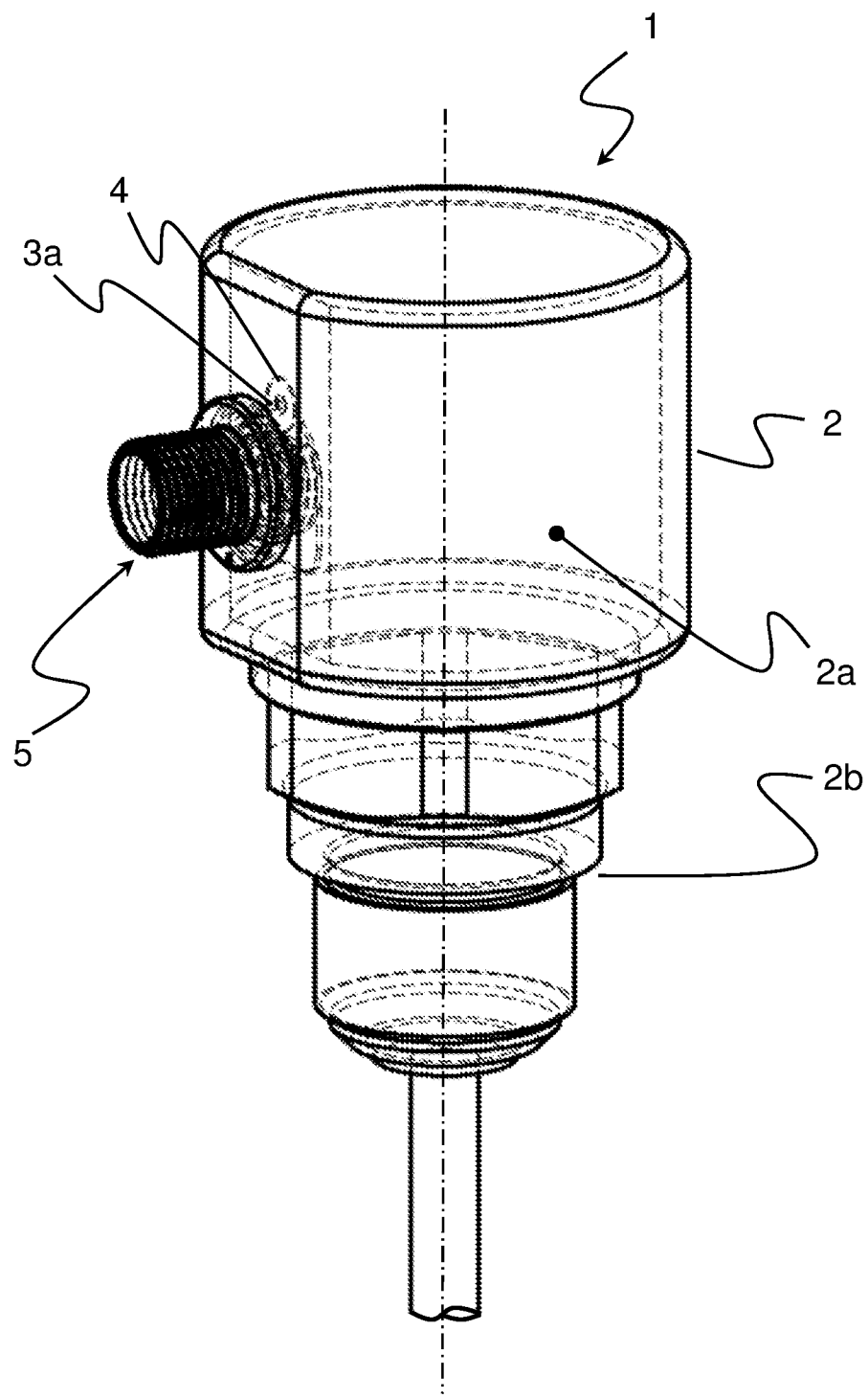

| DE | 102016205117 A1 | * | 11/2016 | ......... H01R 13/5227 |
|---|---|---|---|---|
| DE | 102018117454 B3 | * | 9/2019 | |
| EP | 0616736 A1 | | 9/1994 | |
| EP | 3067670 A1 | * | 9/2016 | ........... G01D 11/245 |
| JP | 2013011556 A | * | 1/2013 | ............. G01L 21/14 |

* cited by examiner

MEASURING DEVICE FOR MEASURING A PHYSICAL VALUE IN A UNIT CONTAINING A MEDIUM

The present invention relates to a measuring device for measuring a physical value such as a pressure, a temperature, or a filling level in a unit containing a medium.

In today's industry, almost all units used such as machines, containers, or lines are monitored by means of measuring devices in the form of sensors. The sensors used serve the purpose of measuring a respective physical value in the unit that can, for example, be a pressure, a temperature, or a filling level of a medium contained in the unit.

A use of the sensors can be specified by guidelines or standards that have to be observed in the planning of the use of the sensors. With an ingress protection class of IP67 or IP69 for housings of a sensor, for example, the housing must be protected from the ingress of foreign bodies, that is the housing is dusttight and withstands water for a specific brief period.

It may occur with such tight housings that pressure differences arise in the housing due to constant and fast temperature changes that are caused by the environment or by operating processes. So-called pump effects can occur due to these pressure differences so that the housing draws moisture despite the sealing and condensation water formation occurs within the housing.

To avoid these pump effects, pressure balance elements are used that typically comprise a membrane that is permeable to air and water vapor, on the one hand, but is water repellent and oil repellent, on the other hand, and a mechanical connection between an inner housing space and surroundings of the housing.

A so-called labyrinth is provided as a mechanical connection between the membrane and the surroundings in pressure balance elements for protection class IP69, with the labyrinth protecting the membrane from a strong jet of water. In this connection, labyrinth means that the mechanical connection is not linear, but is formed with at least one curvature so that the membrane is not visible from the outside and thus has no direct connection to the surroundings.

The pressure balance elements with a labyrinth that are commercially available are more expensive to purchase than pressure balance elements that only consist of a membrane. More space at the housing is required for pressure balance elements with a labyrinth in comparison with pressure balance elements without a labyrinth, which makes the housing larger in size and thus simultaneously more expensive.

The housing additionally has to be pre-treated for the attachment of the pressure balance element with the labyrinth, for example has to be provided with a borehole and a thread, so that further costs result. With pressure balance elements without a labyrinth, the membrane is adhesively bonded to the inner side of the housing and only an opening or borehole is provided in the housing. The membrane is, however, not hereby protected from a jet of water.

It is the underlying object of the invention to improve an initially named measuring device for measuring a physical value such that it can be manufactured inexpensively and simply.

The object is satisfied in accordance with the invention by a measuring device for measuring a physical value in a unit containing a medium having the features of claim 1.

The measuring device for measuring a physical value in a unit containing a medium here comprises:

- a housing that has a wall for housing electronic measuring equipment and a connection section for connecting the measuring device to the unit;
- a membrane that is provided at the wall to cover a first opening in the wall;
- a plug connection that is provided adjacent to the membrane at the wall and that is configured to provide an electrical connection between the electronic measuring equipment and electric plug contacts for a plug connectable to the measuring device;
- a second opening into which the plug connection is pluggable,
- wherein the plug connection is formed with a fastening section to fasten the plug connection to the wall of the housing and the fastening section has a flange element;
- wherein the flange element is arranged on an outer side of the wall and the flange element is configured to cover the first opening and to have at least one outlet borehole that is in communication with the first opening.

A technical advantage results herefrom in that the function of the labyrinth is integrated into the plug connection so that a separate and specific pressure balance element with a labyrinth can be dispensed with.

In accordance with a preferred embodiment, the plug connection comprises an outer section for connecting the plug and the fastening section, with the electrical plug contacts being provided within the outer section and electrical lines being conducted from the electrical plug contacts through the fastening section into the interior of the housing. The construction design of the plug connection thus continues to remain simple and almost the same as conventional plug connections so that no real additional costs arise despite the integration of the pressure balance function.

In accordance with a further preferred embodiment, the plug connection furthermore has an inner section connected to the flange element, with the inner section being pluggable into the second opening and comprising a hollow cylindrical shape with a flattened outer side. The flattened side of the inner section preferably faces the membrane. An alignment of the plug connection to the first opening or to the membrane is hereby possible in a simple manner.

In accordance with a further preferred embodiment, the second opening in the wall is formed with shape matching with the shape of the inner section so that the inner section is pluggable into the housing with an exact fit through the second opening up to the contact of the flange element at the wall. The second opening can be provided more closely to the first opening due to the flattened outer side of the inner section so that a more compact arrangement of the plug connection at the first opening or at the membrane is made possible.

The assembly of the plug connection with an integrated labyrinth can also be carried out more precisely and simply overall. The flange element advantageously has a circular shape that has a greater cross-section than a cross-section of the inner section so that the first opening is covered at one side by the flange element.

A holding clamp is advantageously pluggable into a first groove provided at the inner section to clamp the plug connection tight to the housing. There is thus no need for a special pre-processing of the housing of the measuring device and also for any complicated handling for the assembly of the plug connection at the housing since only an opening in the wall of the housing and a clamping tight by means of the holding clamp are required.

A side of the flange element facing the wall preferably has a second groove that is of circular or spiral shape. The at least one outlet borehole is advantageously aligned coaxially or radially with a plug connection axis of the plug connection. The second groove is in particular configured to provide a connection between the first opening of the wall and the coaxially or radially aligned outlet borehole to permit a pressure balance in the housing.

An integration of the labyrinth protection function for a pressure balance element has thus taken place into the plug connection in a simple manner, whereby a separate pressure balance element with a labyrinth can be dispensed with.

In accordance with a preferred embodiment, a diameter of the first opening is smaller by a multiple than a diameter of the second opening. The manufacture of the measuring device with a specified ingress protection class can hereby be further simplified and made cheaper.

The measuring device in accordance with the invention can be designed in a similar manner by further features and shows similar advantages in this respect. Such further features are described by way of example, but not exclusively, in the dependent claims following the independent claims.

Figure 2:
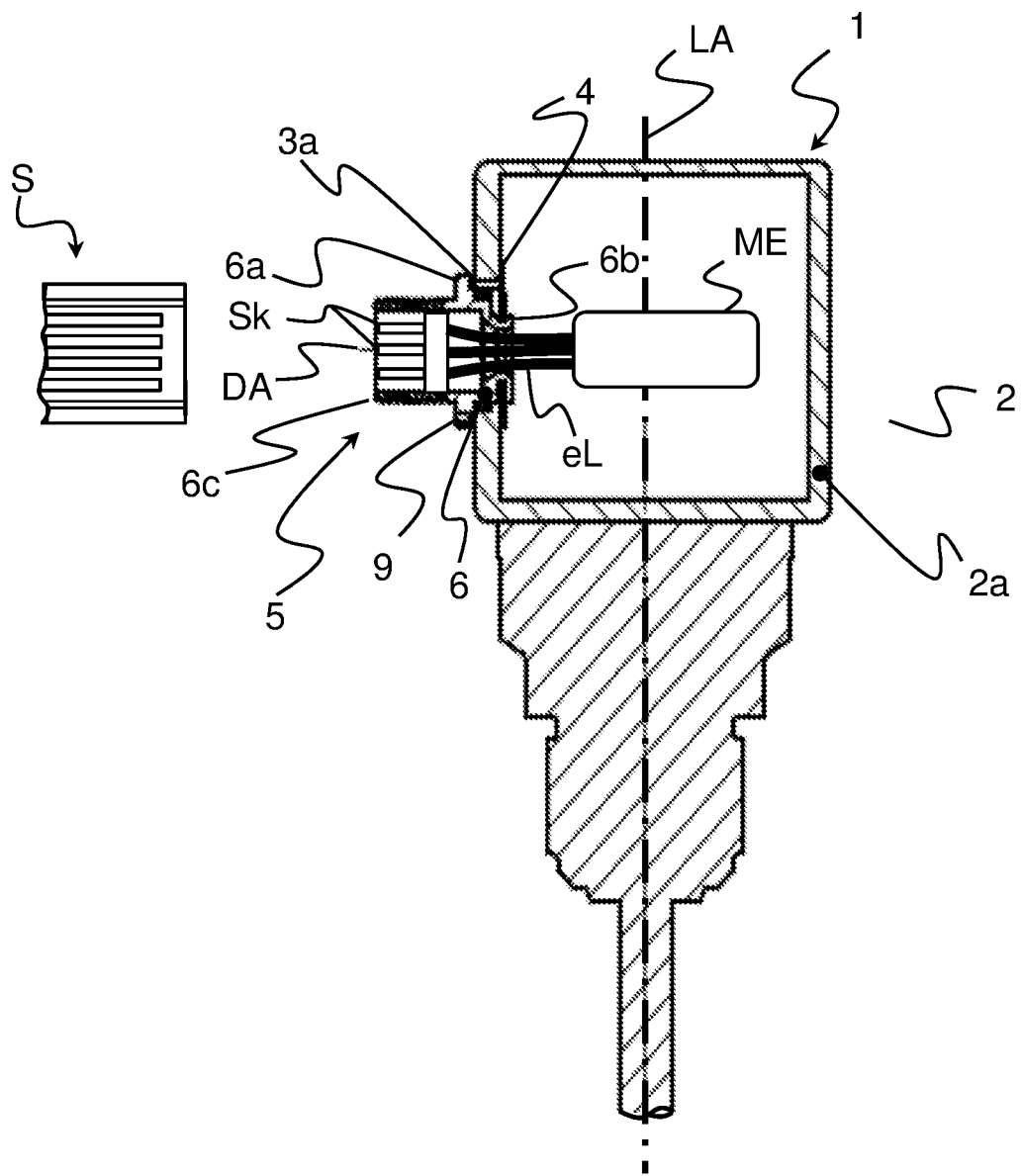
Figure 3:
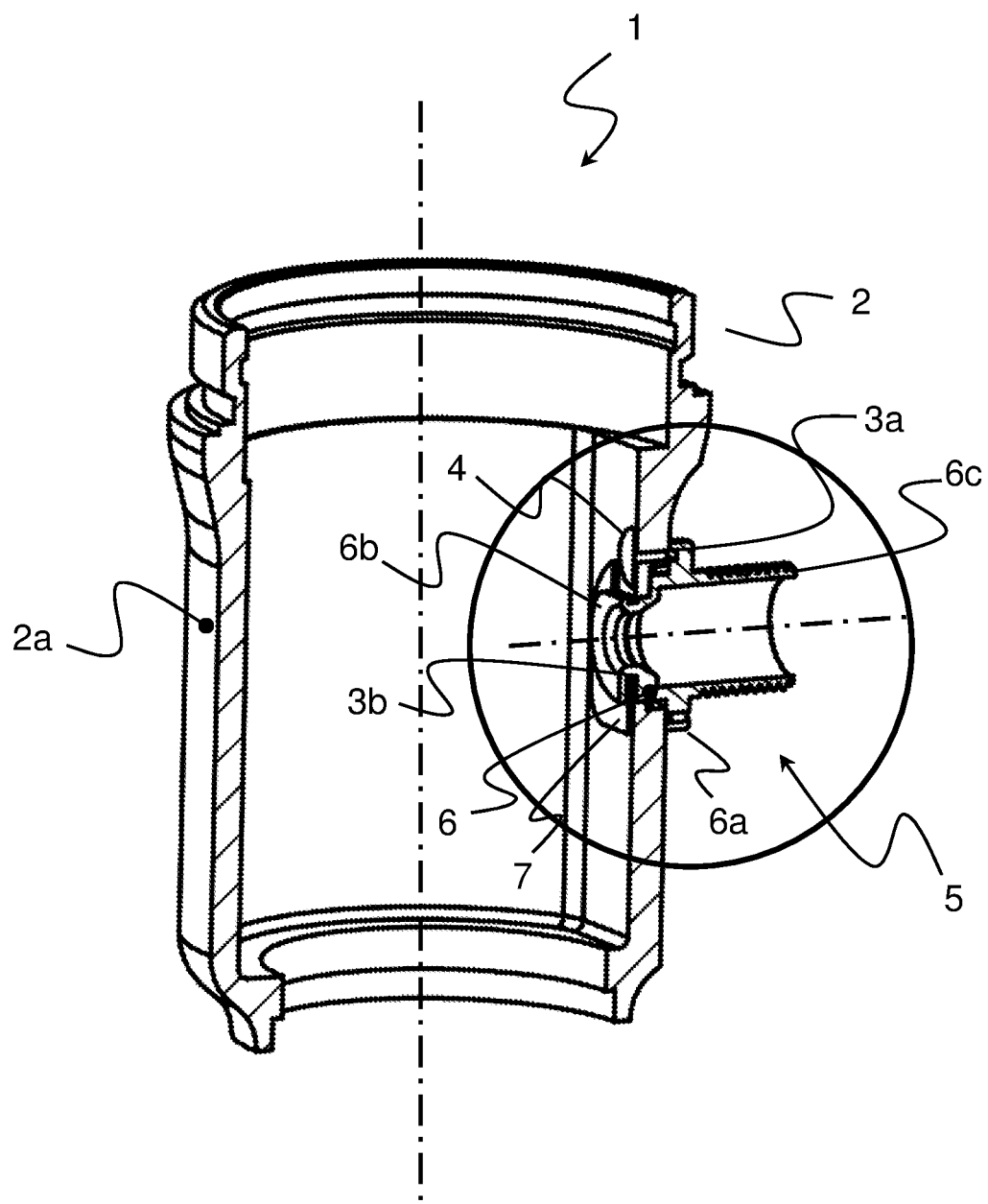
Figure 4:
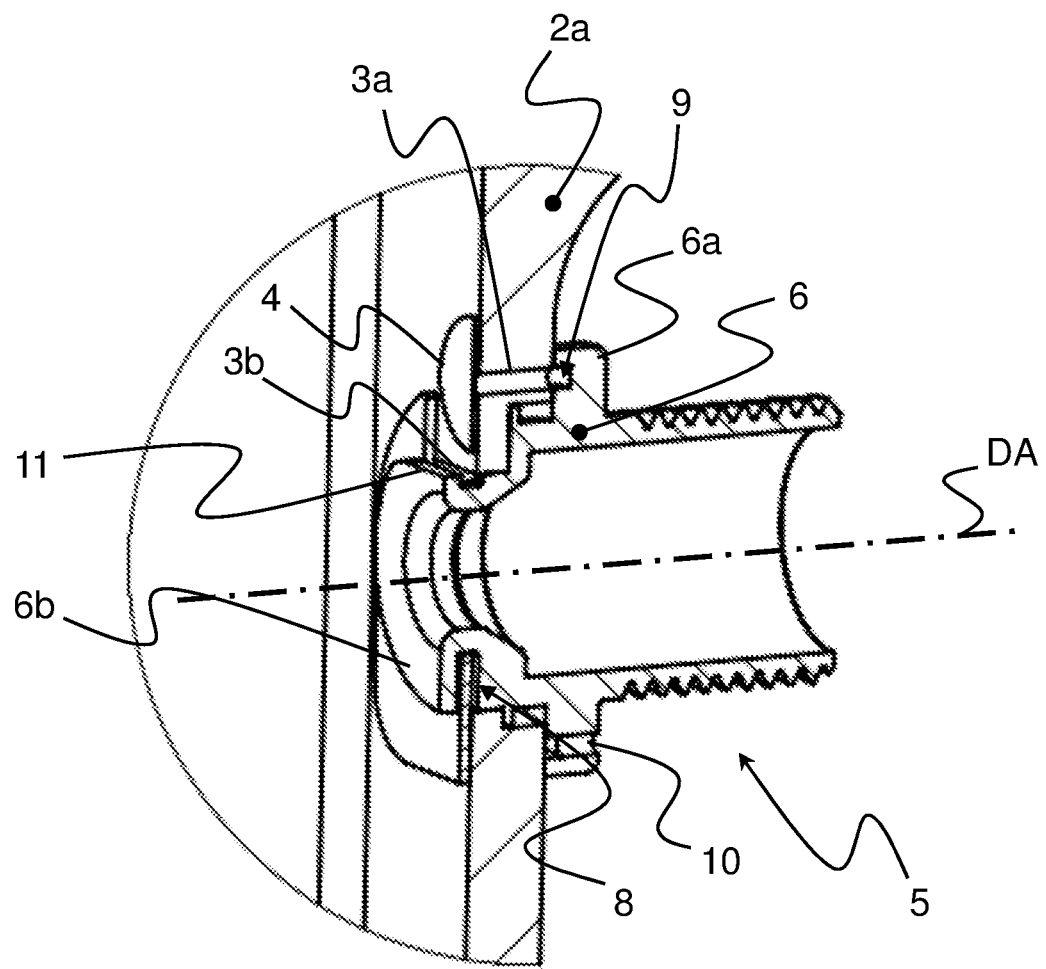

The invention will also be explained in the following with respect to further advantages and features with reference to the enclosed drawing and to embodiments. The Figures of the drawing show in:

FIG. 1 a schematic perspective representation of a preferred embodiment of a measuring device in accordance with the invention;

FIG. 2 a schematic sectional view along a longitudinal axis of the embodiment of FIG. 1;

FIG. 3 a schematic perspective sectional view of an upper housing section of the embodiment with an emphasis of the plug connection; and FIG. 4 a schematic enlarged sectional view of the plug connection of the embodiment in accordance with FIG. 3.

A schematic perspective representation of a preferred embodiment of a measuring device 1 in accordance with the invention for measuring a physical value in a unit, not shown, containing a medium is shown in FIG. 1. The physical value can, for example, be a pressure, a temperature, or a filling level of the medium in the unit. The unit that is not shown can, for example, be a container, a pipeline, or similar.

The measuring device 1 comprises a housing 2 that has a wall 2a that houses electronic measuring equipment ME of the measuring device 1 shown in FIG. 2. The housing 2 further comprises a connection section 2b by which the measuring device 1 can be connected to the unit to measure the desired physical value.

A first opening 3a, in particular in the form of a borehole, is provided in the wall 2a of the housing 2, with the first opening 3a being covered on an inner side of the housing 2 by means of a membrane 4. The membrane 4 is preferably permeable to air and water vapor, but repellent for water, dust, and oil so that a pressure balance of the interior of the housing 2 with the surroundings is possible to avoid pump effects. The wall 2a can have a cylindrical or quadratic cross-sectional shape.

The measuring device 1 further comprises a plug connection 5 that is configured to provide a gastight electrical connection between the electronic measuring equipment ME and electrical plug contacts Sk for a plug S connected to the measuring device 1—as schematically shown in FIG. 2. The plug S can serve to connect the measuring device 1 to, for example, a controller, not shown, to transfer measured signals.

FIG. 2 shows a schematic interface of the measuring device 1 along a longitudinal axis LA of the measuring device 1 together with a partial view of the plug S.

The plug connection 5 is adjacent to the membrane 4 at the wall 2a of the housing 2 and is formed with a fastening section 6 for fastening the plug connection 5 to the wall 2a of the housing 2. The fastening section 6 has a flange element 6a, with the flange element 6a being arranged on an outer side of the wall 2a of the housing 2.

In accordance with the invention, the flange element 6a is configured to cover the first opening 3a and to have at least one outlet bore 9 that is in communication with the first opening 3a. This means that the at least one outlet bore of the flange element 6a of the plug connection 5 makes a pressure balance possible between a housing interior and the surroundings so that a channel is integrated in the plug connection for pressure balance.

The flange element 6a in particular has a circular shape with such a large diameter that the first opening 3a is covered at the outer side.

The plug connection 5 in particular has an inner section 6b connected to the flange element 6a, with the inner section 6b being pluggable into a second opening 3b and comprising a hollow cylindrical shape with a flattened outer side 11. The flattened outer side 11 of the inner section 6b faces the membrane 4. The plug connection 5 is thereby automatically aligned on the plugging of the plug connection 5 into the housing 2.

The flattened outer side of the inner section additionally prevents a rotation of the plug connection 5 with respect to the housing 2. This means that the special shape of the inner section 6b serves the alignment, on the one hand, and the prevention of a rotation of the plug connection 5 with respect to the second opening 3b or to the housing 2, on the other hand.

The plug connection 5 additionally further comprises an outer section 6c for connecting the plug S. The electrical plug contacts Sk are provided within the outer section 6c. Electrical lines eL are conducted from the electrical plug contacts Sk through the fastening section 6 into the interior of the housing 2 in a gastight manner so that the electrical plug contacts Sk are connected to the electronic measurement equipment ME.

Only an upper section of the housing 2 with the plug connection 5 is shown in a schematic perspective sectional view along the longitudinal axis LA of the measuring device 1 in FIG. 3, with the electrical plug contacts Sk, the electrical lines eL, and the electronic measurement equipment ME not being shown.

The outer section 6c of the plug connection 5 is preferably formed with an external thread so that the plug S can be connected to the plug connection 5 by being screwed onto the outer section 6b.

The second opening 3b in the wall 2a is advantageously formed with shape matching with the shape of the inner section 6b so that the inner section 6b is pluggable into the housing 2 with an exact fit through the second opening 3b up to the contact of the flange element 6a at the wall 2a.

An assembly of the plug connection 5 to the housing 2 is simplified and an alignment of the flange element 6a with the first opening 3a can be carried out precisely due to the shape matched design of the inner section 6b and of the second opening 3b. In addition, the second opening 3b can be arranged more closely to the membrane 4 or to the first opening 3a in that the first opening 3a is formed in the region of the flattened outer side 11 of the inner section 6*b* so that the total design of the plug connection 5 can be more compact.

The flange element 6*a* has a circular shape that has a greater cross-section than a cross-section of the inner section 6*b* so that the first opening 3*a* is covered at one side by the flange element 6*a*.

A first groove 8 is provided at an end of the inner section 6*b* into which a holding clamp 7 such as a clamp spring or a retaining ring is pluggable. The holding clamp 7 is arranged between the end of the inner section 6*b* and the wall 2, whereby the plug connection 5 is clamped tight to the housing 2 between the flange element 6*a* and the holding clamp 7.

An open region of the approximately U-shaped holding clamp 7 is aligned in the direction of the first opening 3*a* so that a covering of the first membrane 3*a* or of the membrane 4 on the inner side of the housing 2 is prevented. It is thereby also ensured that the first opening 3*a* is only covered at the outer side by the flange element 6*a* of the plug connection 5.

The approximate U shape of the holding clamp 7 can additionally serve as a centering aid on an attachment of the membrane 4 since the open region of the holding clamp 7 is aligned to the first opening 3*a*. The assembly work can hereby be facilitated.

As is shown in the schematically enlarged sectional view of the plug connection 5 in FIG. 4, the first opening 3*a* is fully covered on the outer side of the wall 2*c* by the flange element 6*a* of the fastening section 6 of the plug connection 5. The first opening 3*a* is only covered by the membrane 4 on the inner side of the wall 2*c*.

A side of the flange element 6*a* facing the wall 2 has a second groove 9 that is formed in a circular or spiral shape in the flange element 6*a*. The at least one outlet bore 10 is furthermore aligned axially in parallel with a plug connection axis DA of the plug connection 5. The at least one outlet bore 10 can preferably also be formed radially to the plug connection axis DA of the plug connection 5 at the flange element 6*a*.

The second groove 9 is formed to provide a connection between the first opening 3*a* of the wall 2 and the outlet bore 10 aligned axially in parallel. For this purpose, the second groove 9 fully covers the first opening 3*a* at an end of the second groove 9 and opens into the outlet bore 10 at the other end of the second groove 9.

A pressure balance can be reliably ensured in the housing 2 with a simultaneous satisfaction of the ingress protection class IP69 due to this connection between the membrane 4 of the first opening 3*a* and the second groove 9 and the outlet bore 10 of the flange element 6*a* of the plug connection 5. The plug connection 5 thus comprises the function of a labyrinth.

Since the measuring device 1 has to be cleaned by means of a high pressure cleaner with certain uses, the membrane 4 is protected by the labyrinth from destruction by a direct effect by a jet of water.

A more compact design of the housing 2 of the measuring device 1 can furthermore be made possible by the integration of the labyrinth function and pressure balance function in the plug connection 5 since no additionally large construction space is required for the integration of a separate pressure balance element with a labyrinth.

REFERENCE NUMERAL LIST 1 measuring device
2 housing
2*a* wall
2*b* connection section
3*a* first opening
3*b* second opening
4 membrane
5 plug connection
6 fastening section
6*a* flange element
6*b* inner section
6*c* outer section
7 holding clamp
8 first groove
9 second groove
10 outlet bore
11 flattened outer side of the inner section
DA plug connection axis
eL electrical line
LA longitudinal axis
ME electronic measurement equipment
S plug
Sk plug contacts

The invention claimed is:

1. A measuring device for measuring a physical value in a unit containing a medium comprising:
 a housing that has a wall for housing electronic measuring equipment and a connection section for connecting the measuring device to the unit;
 a membrane that is provided at the wall to cover a first opening in the wall;
 a plug connection that is provided adjacent to the membrane at the wall and that is configured to provide an electrical connection between the electronic measuring equipment and electric plug contacts for a plug connectable to the measuring device;
 a second opening into which the plug connection is pluggable,
 wherein the plug connection is formed with a fastening section to fasten the plug connection to the wall of the housing and the fastening section has a flange element;
 wherein the flange element is arranged on an outer side of the wall and the flange element is configured to cover the first opening and to have at least one outlet borehole that is in communication with the first opening.

2. A measuring device in accordance with claim 1, wherein the plug connection comprises an outer section for connecting the plug and the fastening section; and wherein the electrical plug contacts are provided within the outer section and electrical lines are conducted from the electrical plug contacts through the fastening section into the interior of the housing.

3. A measuring device in accordance with claim 1, wherein the plug connection has an inner section connected to the flange element, with the inner section being pluggable into the second opening and comprising a hollow cylindrical shape with a flattened outer side.

4. A measuring device in accordance with claim 3, wherein the flattened side of the inner section facing the membrane.

5. A measuring device in accordance with claim 3, wherein the second opening is formed with shape matching with the shape of the inner section so that the inner section is pluggable into the housing with an exact fit through the second opening up to a contact of the first flange element at the wall.

6. A measuring device in accordance with claim 3, wherein the flange element has a circular shape that has a greater cross-section than a cross-section of the inner section so that the first opening is covered by the flange element at the outer side.

7. A measuring device in accordance with claim 3, wherein a holding clamp is pluggable into a first groove provided at the inner section to clamp the plug connection tight to the housing.

8. A measuring device in accordance with claim 1, wherein a side of the flange element facing the wall has a second groove that is of circular or spiral shape.

9. A measuring device in accordance with claim 1, wherein the at least one outlet borehole is aligned coaxially or radially with a plug connection axis of the plug connection.

10. A measuring device in accordance with claim 8, wherein the at least one outlet borehole is aligned coaxially or radially with a plug connection axis of the plug connection; and wherein the second groove is configured to provide a connection between the first opening and the outlet bore to permit a pressure balance in the housing.

11. A measuring device in accordance with claim 1, wherein a diameter of the first opening is smaller by a multiple than a diameter of the second opening.

\* \* \* \* \*